United States Patent [19]

Zinnes et al.

[11] 3,856,784

[45] Dec. 24, 1974

[54] ALKYLAMINOALKYL 4-HYDROXY-2-METHYL-2H-1,2-BENZOTHIAZINE-3-CARBOXYLATE 1,1-DIOXIDES AND N-ALKYLAMINOALKYL-4-HYDROXY-2-METHYL-2H-1,2-BENZOTHIAZINE-3-CARBOXAMIDE 1,1-DIOXIDES

[75] Inventors: Harold Zinnes, Rockaway; Jagadish C. Sircar, Dover; John Shavel, Jr., Mendham, all of N.J.

[73] Assignee: Warner-Lambert Company, Morris Plains, N.J.

[22] Filed: Nov. 16, 1971

[21] Appl. No.: 199,342

[52] U.S. Cl. .......................... 260/243 R, 424/246
[51] Int. Cl. ............................................ C07d 93/02
[58] Field of Search .............................. 260/243 R

[56] References Cited
UNITED STATES PATENTS 3,492,298  1/1970  Rasmussen .......................... 260/243
3,501,466  3/1970  Rasmussen .......................... 260/243

*Primary Examiner*—John M. Ford
*Attorney, Agent, or Firm*—Albert H. Graddis, Frank S. Chow

[57] ABSTRACT

Compounds of the formulas:

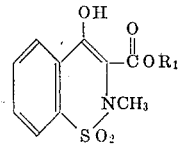 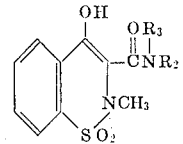

I  II are disclosed wherein $R_1$ is dialkylaminoalkyl; $R_2$ is dialkylaminoalkyl or monoalkylaminoalkyl and $R_3$ is hydrogen or alkyl. These compounds are useful as central nervous system stimulating agents and they also exhibit antihistaminic properties.

15 Claims, No Drawings

ALKYLAMINOALKYL 4-HYDROXY-2-METHYL-2H-1,2-BENZOTHIAZINE-3-CARBOXYLATE 1,1-DIOXIDES AND N-ALKYLAMINOALKYL-4-HYDROXY-2-METHYL-2H-1,2-BENZOTHIAZINE-3-CARBOXAMIDE 1,1-DIOXIDES

The present invention is concerned with novel benzothiazines as well as novel processes for the production of these compounds. More particularly, the present invention is concerned with benzothiazines having the following structural formulas:

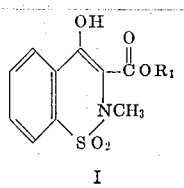 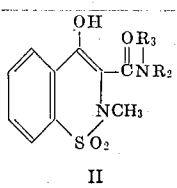

I   II wherein $R_1$ is dialkylaminoalkyl, such as, $(CH_3)_2NCH_2CH_2—$, $(CH_3)_2NCH_2CH_2CH_2—$; $R_2$ is dialkylaminoalkyl or monoalkylaminoalkyl, such as, $(CH_3)_2CHNHCH_2CH_2—$ and $R_3$ is hydrogen or alkyl of 1 to 7 carbon atoms.

According to the process of this invention, compounds of Structure I and Structure II (where $R_2$ is a dialkylaminoalkyl group) are prepared from III which has been described by Zinnes et al. J. O. C. 31, 162 (1966).

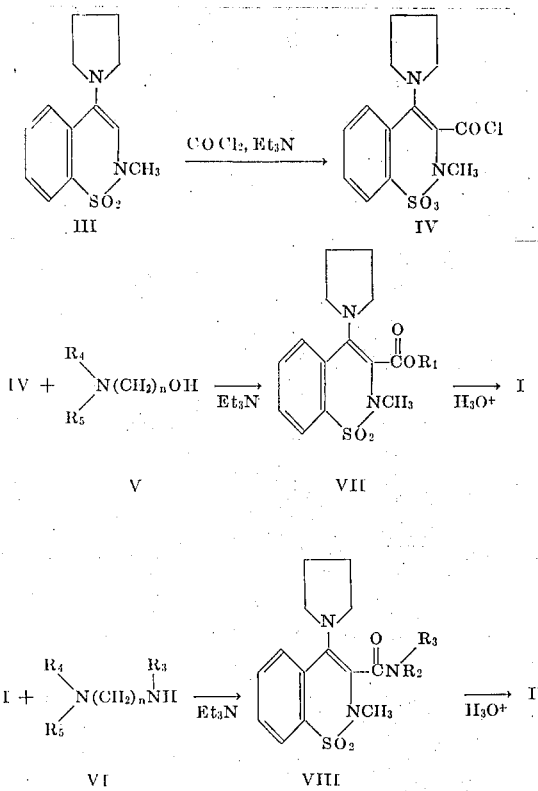

Compound III is treated with phosgene in the presence of a base such as triethylamine to form the acid chloride IV which is not isolated as such. The reaction mixture, containing IV, is reacted with a dialkylamino alcohol of formula V or a dialkylaminoalkylamine of formula IV (where $R_4$ and $R_5$ are alkyl) to give an enamine-ester of formula VII or an enamine-carboxamide of formula VIII. Compounds VII and VIII are converted to compounds I and II, respectively, by refluxing with aqueous acid.

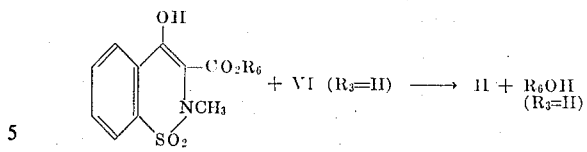

IX

An alternative method of preparing compounds of formula II where $R_3$ is H, including those in which $R_2$ is monoaminoalkyl, consists of refluxing an ester of formula IX ($R_6$ is alkyl) with an aminoalkylamine of formula VI ($R_4$ is alkyl, $R_5$ is H or alkyl, $R_3$ is H) in a solvent such as toluene or xylene. The reaction is best carried out in a Soxhlet apparatus, the thimble of which contains Linde type 4A molecular sieve to remove the alcohol which is formed in the reaction. Compounds of structure IX are described in U.S. Pat. No. 3,501,446.

The compounds of this invention, i.e., those compounds having the structures I and II above as well as the intermediate enamines VII and VIII exhibit central nervous system stimulation activity when administered intraperitoneally to mice at a dose of 100 mg/kg. Accordingly, these compounds are useful in conditions such as lethargic condition where a moderate central nervous system stimulant is desired. Generally speaking, a dose of 100 mg two or three times daily is recommended.

In addition, these compounds also exhibit antihistaminic activity, for example, when they are administered intraperitoneally at a dose of 25 mg/kg to guinea pigs which have been previously exposed to a histamine aerosol, their survival time is significantly prolonged.

In order to use these compounds they are formulated with standard pharmaceutical vehicles for injection. These vehicles include, for example, peanut oil, sesame oil and the like.

In order to further illustrate the practice of this invention the following examples are included.

EXAMPLE 1

3-Dialkylaminoalkyl 2-methyl-4-(1-pyrrolidinyl-2H-1,2-benzothiazine-3-carboxylate 1,1-dioxides and N-[3-(dialkylamino)-al--2-methyl-4(1-pyrrolidinyl)-2H-1,2-benzothiazine-3-carboxamide 1,1-dioxides A solution of 6.0 g (0.06 mol) of phosgene in 55 ml of benzene was diluted with 30 ml of tetrahydrofuran (freshly distilled from lithium aluminum hydride) and cooled to $-10°$. To this was added, over a period of 30 minutes, a solution of 13.2 g (0.05 mol) of 2-methyl-4-(1-pyrrolidinyl)-2H-1,2-benzothiazine 1,1-dioxide and 9.2 ml of triethylamine in 200 ml of tetrahydrofuran and the reaction mixture was stirred at room temperature for 3 hours. A solution of 0.068 mol of the appropriate N,N-dialkylamino alcohol or N,N-dialkylaminoalkylamine and 8.2 ml of triethylamine in 50 ml of tetrahydrofuran was added at room temperature over a period of 10 minutes and stirring was continued for an additional hour. The reaction mixture was refluxed for 1–16 hours, concentrated to half of its volume, treated with ice water, and extracted with dichloromethane. Evaporation of the solvent gave a residue which was triturated with 500 ml of ether and an insoluble polymeric material was filtered off. The filtrate was concentrated to a small volume to cause precipitation of the crude enamine-amide. This was purified as described for the individual examples.

EXAMPLE 2

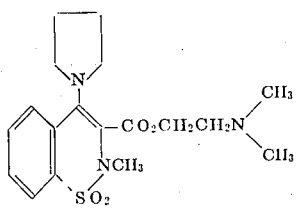

2-(Dimethylamino)ethyl 2-methyl-4-(1-pyrrolidinyl)-2H-1,2-benzothiazine-3-carboxylate 1,1-dioxide The reaction and work-up were carried out as described above, using 5.0 g of β-dimethylaminoethanol and only 1 hour reflux time. The crude product was stirred with a mixture of 450 ml of ether and 25 ml of dichloromethane. The mixture was filtered to remove more insoluble polymer and the filtrate was concentrated to a volume of 125 ml to given 7.5 g of crystalline product, m.p. 103°–105° dec.

Anal. for $C_{18}H_{25}N_3O_4S$:
Calcd: C, 56.97 H, 6.64 N, 11.07 S, 845
Found: C, 57.11 H, 6.54 N, 11.15 S, 8.64

EXAMPLE 3

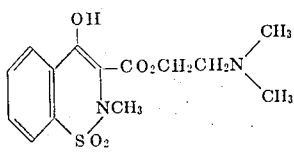

2-(Dimethylamino)ethyl 4-hydroxy-2-methyl-2H-1,2-benzothiazine-3-carboxylate 1,1-dioxide A mixture of 9.0 g of 2-(dimethylamino)ethyl 2-methyl-4-(1-pyrrolidenyl)-2H-1,2-benzothiazine-3-carboxylate 1,1-dioxide and 90 ml of 1N hydrochloric acid was heated on a steam bath for 30 minutes, cooled and filtered. The filtrate was made basic (pH 9) with 1N sodium hydroxide, made acidic (pH 6.0) by the addition of acetic acid, and extracted with dichloromethane. The dichloromethane solution was washed well with water, dried over sodium sulfate and evaporated. The residue was triturated with ether to give 7.8 g of solid, m.p. 158°–162° dec. It was stirred with a mixture of 200 ml of dichloromethane and 200 ml of ether, filtered, and the filtrate was concentrated to 250 ml to give 6.3 g of crystalline product, m.p. 164°–167° dec.

Anal. for $C_{14}H_{18}N_2O_5S$:
Calcd: C, 51.52 H, 5.56 N, 8.58 S, 9.82
Found: C, 51.42 H, 5.65 N, 8.56 S, 9.94

EXAMPLE 4

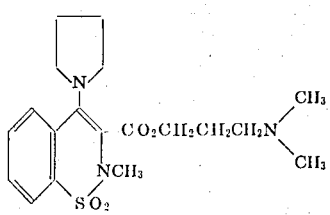

3-(Dimethylamino)propyl 2-methyl-4-(1-pyrrolidinyl)-2H-1,2-benzothiazine-3-carboxylate 1,1-dioxide The reaction and work-up were carried out as described above, using 5.7 g of 3-(N,N-dimethylamino-1-propanol and 16 hours reflux time. The crude product was stirred with a mixture of 350 ml of ether and 50 ml of dichloromethane. The mixture was filtered and the filtrate was concentrated to 75 ml and diluted with 25 ml of petroleum ether to cause precipitation of more polymeric material. This was filtered off and the filtrate was slowly evaporated under a stream of nitrogen to give 12.6 g of crystalline product, m.p. 74°–76° dec.

Anal. for $C_{19}H_{27}N_3O_4S$:
Calcd: C, 57.99 H, 6.92 N, 10.68 S, 8.15
Found: C, 57.93 H, 6.72 N, 10.56 S, 8.34

EXAMPLE 5

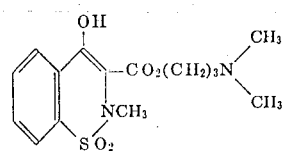

3-(Dimethylamino)propyl 4-hydroxy-2-methyl-2H-1,2-benzothiazine-3-carboxylate 1,1-dioxide A mixture of 11.5 g of 3-(dimethylamino)propyl 2-methyl-4-(1-pyrrolidinyl-2H-1,2-benzothiazine-3-carboxylate 1,1-dioxide and 100 ml of 1N hydrochloric acid was heated on a steam bath for 30 minutes, poured into ice water and basified to pH 9 by the addition of 100 ml of 1N sodium hydroxide. It was filtered from suspended impurities, carefully acidified to pH 5.0 by the addition of acetic acid, and saturated with sodium chloride. The white solid which crystallized out was collected, dried, and refluxed with 1000 ml of acetonitrile. The insoluble material was collected and combined with the crystals obtained on concentration of the acetonitrile solution to a volume of 150 ml. The combined material, m.p. 220°–223° dec, weighed 7.8 g. Recrystallization from methanol gave 5.0 g of analytically pure hydrochloride, m.p. 220°–223° dec.

Anal. for $C_{15}H_{20}N_2O_5S \cdot HCl$:
Calcd: C, 47.55 H, 5.71 N, 7.34 S, 8.76 Cl, 9.16
Found: C, 47.81 H, 5.62 N, 7.43 S, 8.57 Cl, 9.41

Treatment of the hydrochloride salt with dilute sodium hydroxide gave rise to the free base which was isolated by extraction with dichloromethane. Evaporation of the solvent and recrystallization of the residue from acetonitrile gave crystalline free base, m.p. 211°–215° dec.

Anal. for C₁₅H₂₀N₂O₃S:
Calcd: C, 52.93 H, 5.92 N, 8.23 S, 9.42
Found: C, 52.88 H, 5.93 N, 8.15 S, 9.25

EXAMPLE 6

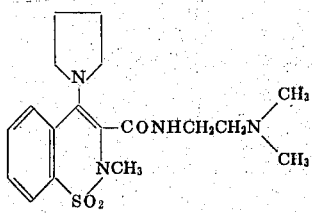

N-[2-Dimethylamino)ethyl]-2-methyl-4-(1-pyrrolidinyl)-2H-1,2-benzothiazine-3-carboxamide 1,1-dioxide The reaction and work-up were carried out as described above, using 4.9 g of β-dimethylaminoethylamine and 16 hours reflux time. The dichloromethane extract was stirred with 400 ml of ether. An insoluble polymeric material was filtered off, the filtrate was concentrated to a volume of 100 ml and refrigerated to give 6.3 g of crystalline material m.p. 72°–74° dec. This was stirred with 400 ml of ether. Filtration, concentration of the filtrate, and refrigeration gave 4.3 g of material, m.p. 72°–74° dec.

Anal. for C₁₈H₂₆N₄O₃S:
Calcd: C, 57.12 H, 6.92 N, 14.80 S, 8.47
Found: C, 57.34 H, 6.89 N, 15.04 S, 8.48

EXAMPLE 7

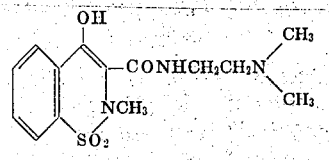

N-[2-(Dimethylamino)ethyl]-4-hydroxy-2-methyl-2H-1,2-benzothiazine-3-carboxamide 1,1-dioxide A mixture of 20 g of crude N-[2-dimethylamino)ethyl]-2-methyl-4-pyrrolidinyl-2H-benzothiazine-3-carboxamide 1,1-dioxide and 150 ml of 1N hydrochloric acid was heated on a steam bath for 30 minutes, cooled and washed with dichloromethane. The cold aqueous acidic solution was carefully basified to pH 9 by the addition of 1N sodium hydroxide, washed once with dichloromethane, and acidified to pH 5.5–6.0 by the addition of acetic acid. Extraction with dichloromethane and evaporation of the solvent gave a residue which was triturated with 30 ml of methanol to give 6.0 g of crude solid. Recrystallization from methanol gave 4.9 g of crystalline product, m.p. 160°–162°.

Anal. for C₁₄H₁₉N₃O₄S:
Calcd: C, 51.68 H, 5.89 N, 12.91 S, 9.85
Found: C, 51.63 H, 5.84 N, 13.00 S, 10.00

EXAMPLE 8

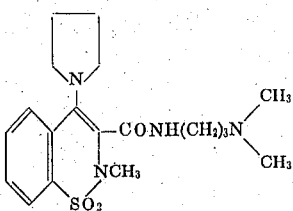

N-[3-(Dimethylamino)propyl]-2-methyl-4-(1-pyrrolidinyl)-2H-1,2-benzothiazine-32-methyl-1,1-dioxide The reaction and work-up was carried out as in previous examples, using 5.6 g of N,N-dimethylpropan-1,3-diamine and 16 hours reflux time. The usual work-up procedure gave 16.8 g of crude product, m.p. 141°–143° Dec. This was dissolved in refluxing dichloromethane and sufficient isopropyl ether was added to cause turbidity. The hot mixture was filtered to remove insoluble polymer and the filtrate allowed to cool to room temperature to give 13.5 g of material, m.p. 141°–143° dec.

Anal. for C₁₉H₂₈N₄O₃S:
Calcd: C, 58.14 H, 7.19 N, 14.27 S, 8.17
Found: C, 58.03 H, 7.26 N, 14.25 S, 8.39

EXAMPLE 9

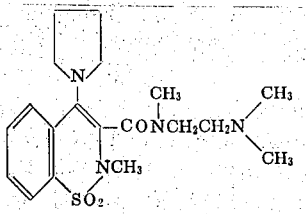

N-[2-(Dimethylamino)ethyl]-2,N-dimethyl-4-(1-pyrrolidinyl)-2H-1,2-benzothiazine-3-carboxamide 1,1-dioxide The reaction was carried out as in the previous examples, using 5.6 g (0.055 mol) of N,N,N'-trimethylethylenediamine and 16 hours reflux time. The usual work-up gave 17.8 g of crude product, m.p. 103°–107° dec. This was dissolved in a mixture of 300 ml of isopropyl ether and 200 ml of dichloromethane and distilled at atmospheric pressure till a solid began to separate (volume about 200 ml). This was removed by filtration and the filtrate was concentrated further and allowed to stand to give 12.3 g of crystalline product, m.p. 103°–105° dec.

Anal. for C₁₉H₂₈N₄O₃S:
Calcd: C, 58.14 H, 7.19 N, 14.27 S, 8.17
Found: C, 58.17 H, 7.17 N, 13.99 S, 8.39

EXAMPLE 10

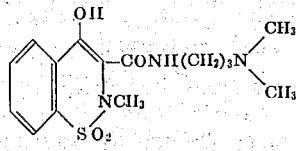

N-[3-(Dimethylamino)propyl]-4-hydroxy-2-methyl-2H-1,2-benzothiazine-3-carboxamide 1,1-dioxide A mixture of 12.0 g of N-[3-(dimethylamino)propyl]-2-methyl-4-(1-pyrrolidinyl)-2H-1,2-benzothiazine-3-carboxamide 1,1-dioxide and 100 ml of 1N hydrochloric acid was heated on a steam bath for 30 minutes. It was diluted with ice water, basified to pH 9.0 by the addition of 1N sodium hydroxide, filtered from suspended impurities, acidified to pH 5 by the addition of acetic acid, saturated with sodium chloride, and extracted with dichloromethane. Much of the product crystallized from the dichloromethane on standing. This was collected and the filtrate concentrated to a volume of 100 ml to give still more crystals. The crops were combined and recrystallized from methanol to give 6.8 g of material, m.p. 202°–204° dec.

Anal. for $C_{15}H_{21}N_3O_4S$:
  Calcd: C, 53.08 H, 6.24 N, 12.38 S, 9.45
  Found: C, 53.04 H, 6.27 N, 12.48 S, 9.51

EXAMPLE 11

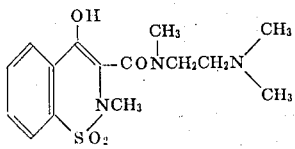

N-[2-(Dimethylamino)ethyl]-4-hydroxy-2,N-dimethyl-2H-1,2-benzothiazine-3-carboxamide 1,1-dioxide A mixture of 11.5 g of N-[2-(dimethylamino)ethyl]-2,N-dimethyl-4-(1-pyrrolidinyl)-2H-1,2-benzothiazine-3-carboxamide 1,1-dioxide and 115 ml of 1N hydrochloric acid was heated on a steam bath for 45 minutes, filtered from suspended insolubles, diluted with ice water, and basified to pH 9 by the addition of 1N sodium hydroxide. It was filtered to remove suspended material, acidified to pH 6.5 with acetic acid, saturated with sodium chloride, and extracted with dichloromethane. Evaporation of the solvent gave an oily residue which could not be made to crystallize. It was dissolved in 50 ml of ethanol and the resulting solution was added to a solution of 12 g of picric acid in 200 ml of ethanol. The crude picrate, which precipitated, was collected and recrystallized from ethanol-dichloromethane to give 7.8 g of crystalline picrate, m.p. 174°–177° dec.

EXAMPLE 12

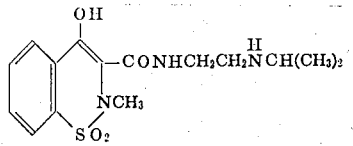

4-Hydroxy-N-[2-(isopropylamino)ethyl]-2-methyl-2H-1,2-benzothiazine-3-carboxamide 1,1-dioxide A mixture of 14.2 g (0.05 mol) of ethyl 4-hydroxy-2-methyl-2H-1,2-benzothiazine-3-carboxylate 1,1-dioxide, 5.6 g (0.055 mol) of N-isopropylethylenediamine, and 500 ml of xylene was refluxed for 20 hours in a Soxhlet apparatus, the thimble of which contained 20 g of Linde 4A molecular sieve. The precipitate which separated out on cooling was collected and recrystallized from methanol to give 9.5 g of crystalline product, m.p. 229°–231° dec. Another recrystallization gave 7.2 g of material, m.p. 236°–239° dec.

Anal. for $C_{15}H_{21}N_3O_4S$:
  Calcd: C, 53.08 H, 6.24 N, 12.38 S, 9.45
  Found: C, 53.27 H, 6.34 N, 12.40 S, 9.52

We claim:
1. A member selected from a group consisting of compounds of the formula:

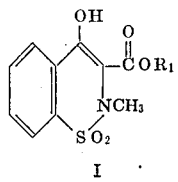 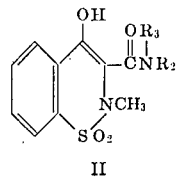

I  II wherein $R_1$ is dialkylaminoalkyl; $R_2$ is a member selected from a group consisting of dialkylaminoalkyl and monoalkylaminoalkyl and $R_3$ is a member selected from a group consisting of hydrogen and alkyl in which alkyl has 1–7 carbon atoms.

2. A compound according to claim 1 which is 2-(Dimethylamino)ethyl 4-hydroxy-2-methyl-2H-1,2 benzothiazine-3-carboxylate 1,1-dioxide.

3. A compound according to claim 1 which is 3-(Dimethylamino)propyl 4-hydroxy-2-methyl-2H-1,2-benzothiazine-3-carboxylate 1,1-dioxide.

4. A compound according to claim 1 which is N-[2-(Dimethylamino)ethyl]-4-hydroxy-2-methyl-2H-1,2-benzothiazine-3-carboxamide 1,1-dioxide.

5. A compound according to claim 1 which is N-[3-(Dimethylamino)propyl]-4-hydroxy-2-methyl-2H-1,2-benzothiazine-3-carboxamide 1,1-dioxide.

6. A compound according to claim 1 which is N-[2-(Dimethylamino)ethyl]-4-hydroxy-2,N-dimethyl-2H-1,2-benzothiazine-3-carboxamide 1,1-dioxide.

7. A compound according to claim 1 which is 4-Hydroxy-N-[2-(isopropylamino)ethyl]-2-methyl-2H-1,2-benzothiazine-3-carboxamide 1,1-dioxide.

8. A compound of the formula:

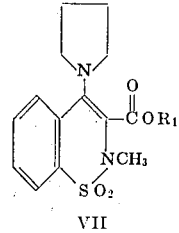

VII wherein $R_1$ is dialkylaminoalkyl in which alkyl has 1–7 carbon atoms.

9. A compound of the formula:

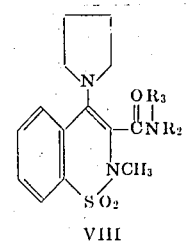

VIII wherein $R_2$ is a member selected from a group consisting of dialkylaminoalkyl and monoaminoalkyl and $R_3$ is a member selected from a group consisting of hydrogen and alkyl in which alkyl has 1–7 carbon atoms.

10. 2-(Dimethylamino)ethyl 2-methyl-4-(1-pyrrolidinyl)-2H-1,2-benzothiazine-3-carboxylate 1,1-dioxide.

11. 3-(Dimethylamino)propyl 2-methyl-4-(1-pyrrolidinyl)-2H-1,2-benzothiazine-3-carboxylate 1,1-dioxide.

12. N-[2-(Dimethylamino)ethyl]-2-methyl-4-(1-pyrrolidinyl)-2H-1,2-benzothiazine-3-carboxamide 1,1-dioxide.

13. N-[3-(Dimethylamino)propyl]-2-methyl-4-(1-pyrrolidinyl)-2H-1,2-benzothiazine-3-carboxamide 1,1-dioxide.

14. N-[2-(Dimethylamino)ethyl]-2,N-dimethyl-4-(1-pyrrolidinyl)-2H-1,2-benzothiazine-3-carboxamide 1,1-dioxide.

15. A compound of the formula:

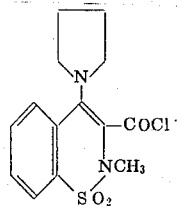

* * * * *